Patented Jan. 22, 1935

1,988,499

UNITED STATES PATENT OFFICE 1,988,499

PROCESS FOR TREATING SPIRIT SOLUBLE NIGROSINES

Spencer Christian Kimmel, Buffalo, N. Y., assignor to National Aniline and Chemical Company, Inc., New York, N. Y., a corporation of New York No Drawing. Application March 28, 1931, Serial No. 526,144

12 Claims. (Cl. 260—29)

This invention relates to a process for treating spirit soluble nigrosines, and to the product obtained thereby.

The hydrochlorides of the coloring matters produced by the action of nitro compounds of the aromatic series, for example, nitrobenzene or nitrophenol, on arylamines, in the presence or absence of a catalyst, such as iron chlorides, are known as spirit soluble nigrosines or spirit nigrosines. These coloring matters are soluble in alcohol, and are precipitated from their alcoholic solution by addition of alkali thereto.

One of the objects of the present invention is the production of a spirit nigrosine which has a greater solubility in alcohol. A further object is the production of a spirit nigrosine which has a brighter shade. Still another object of the invention is the production of spirit nigrosine in a form which is readily separated from its aqueous suspensions by filtration. A further object is the production of a spirit nigrosine which is suitable for use in coloring molding resins, and which, when so used, will not cause pitting of the mold. These and other objects of the invention are accomplished by the present invention as will become readily apparent upon consideration of the following description of the invention.

According to the present invention, spirit soluble nigrosines prepared in the usual manner as above described are treated with an acid removing medium; more particularly, an alkali, preferably a small quantity of an alkali. The coloring matters, after such treatment, become less gelatinous in aqueous suspensions and are more easy to filter and wash. They are also more soluble in alcohol which property renders them particularly useful for coloring lacquers, spirit varnishes, etc., and resins, e. g., of the "Bakelite", "Glyptal", urea-formaldehyde type, etc., and when employed in coloring molding resins they have little or no tendency to pit the mold. The coloring matters, after treatment with alkali according to the present invention, have a redder appearance when dry, as well as in alcohol solution, than coloring matters not so treated. In view of the action of alkalis on alcoholic solutions of the spirit soluble nigrosines, it was not to be expected that treatment of the coloring matter with a small quantity of alkali would render the same more soluble.

Preferably, the treatment of the coloring matter with alkali is carried out in aqueous media. It may be performed during the process of manufacture of the coloring matter, or it may be carried out on the finished coloring matter with substantially equal results. The amount of alkali added is preferably that which is sufficient to give a spirit soluble nigrosine which is neutral to Congo red test paper.

In carrying out the present invention according to the preferred method of procedure, a crude spirit soluble nigrosine melt, for example, as prepared by heating aniline, hydrochloric acid, nitrobenzene and iron chloride to a temperature of about 180° C., is drowned with agitation in dilute hydrochloric acid to reduce the melt to a granular mass, and after permitting the solids to settle, the supernatant liquid is decanted off. The residual mass of coloring matter is washed by agitating the same with water, permitting the coloring matter to settle and decanting off the supernatent liquid. This washing may be repeated one or more times. Finally, the residue of coloring matter is agitated with water, and while the resulting slurry is agitated, there is gradually added alkali, preferably an aqueous solution of caustic soda, until the resulting slurry shows a faint alkaline reaction to indicators. Although this alkalinity of the liquid does not persist, i. e., it disappears after the liquid stands for a few minutes, so that a test on the liquid made a few minutes later will not show an alkaline reaction, the quantity of alkali is nevertheless sufficient if it produces just a faint alkaline reaction. The coloring matter is then allowed to settle, and the supernatant liquid is decanted off. The dyestuff is then filtered, washed with water on the filter, dried and ground.

In applying the invention to the treatment of the finished spirit nigrosine the finely divided coloring matter is suspended in water, and to the well agitated suspension is added a solution of alkali until the suspension shows a faint alkaline reaction to brilliant yellow test paper. Upon standing for about five minutes the alkalinity of the suspension will have disappeared. However, the suspension will not show an acid reaction to Congo red test paper.

The invention will be illustrated by the following example.

*A.—Nigrosine melt.*—An iron liquor is prepared by adding 1400 pounds of iron borings or turnings gradually to 7500 pounds of 20° Bé. hydrochloric acid, heating the mass to boiling to dissolve the iron, and then allowing insoluble matter in the liquor to settle.

1595 pounds of aniline oil, 465 pounds of 20° Bé. hydrochloric acid and 120 pounds of the iron liquor, prepared as described above, are charged into an electrically heated iron kettle. The charge is then heated to about 100° C. as rapidly as possible to distill off the water, which carries with it some of the aniline. The temperature is then gradually raised to about 140° C., by which time substantially all the water has been driven off. A reflux condenser is then connected to the kettle. 600 pounds of nitrobenzene are now gradually added, at the same time raising the temperature of the charge in the kettle to about 160° C. Any water formed during the reaction will pass through the reflux condenser, which is maintained at about the boiling point of water, in the form of steam, while the greater part of the oils will be condensed and returned to the reaction. The temperature is then increased to about 180° C. where it is held for about 12 hours more or less, or until the reaction is completed, as indicated when the reaction mass no longer contains an appreciable amount of nitrobenzene.

The melt is then blown into a vat containing about 8,000 pounds water mixed with about 800 pounds 20° Bé. hydrochloric acid while the liquid in the vat is agitated. When the melt has been added, the contents of the vat are heated to boiling for about one hour, and is then tested for acidity with Congo red test paper. If no acidity is shown in this test more hydrochloric acid is added until the acid reaction to Congo red persists. The contents of the vat are then allowed to settle for several hours, and the supernatant liquid is decanted off. To the remaining color in the vat is added about 8,000 pounds water, and the contents of the vat are heated to boiling with agitation for about one hour. The batch is then allowed to settle again for several hours and the supernatant liquid is decanted off.

*B.—Treatment with alkali.*—To the color in the vat is now added about 2,000 pounds water, and the contents of the vat are heated to about 40° C., with agitation. Aqueous caustic soda is gradually added until the liquid in the vat shows a faintly alkaline reaction to brilliant yellow test paper, about 30 pounds of 47° Bé. aqueous caustic soda being required. This alkaline reaction of the liquid does not persist, for a test taken a few minutes later with brilliant yellow test paper will not show an alkaline reaction, neither will a test with Congo red test paper show an acid reaction. The contents of the vat then are dropped to a filter press where it is filtered, washed with water, and blown dry. The color when dried and ground is a reddish black powder. It is soluble in alcohol, and practically insoluble in water.

It will be understood that the invention is not limited to the details of manufacture of the nigrosine hydrochloride as above described. The proportion of ingredients in the melt may be varied; the time of heating and other details of operation may be varied, as well known in the art, to produce various shades of nigrosine hydrochloride without departing from the present invention.

The exact proportion of alkali to be added to the spirit soluble nigrosines cannot be definitely stated in all cases. To some extent it will depend on the thoroughness of the prior washings to remove the hydrochloric acid. In general, it may be stated that the quantity of alkali employed is such as will produce a faintly alkaline reaction to brilliant yellow test paper. A slightly greater quantity of alkali, for example, just sufficient to produce a permanent alkaline reaction, tends to reduce the solubility of the coloring matter in alcohol but does not render it unfit for use in coloring molding resins since it still eliminates pitting of the molds. The use of such quantity of alkali also still renders the coloring matter less gelatinous and permits the coloring matter to be more easily filtered.

In place of caustic soda employed in the above example, other compounds which are acid binding agents may be used, such as lime, potash, soda ash, ammonia, etc., with substantially equal results.

Having described my invention what I claim as new and wish to secure by Letters Patent is:

1. The process which comprises treating an aqueous suspension of spirit nigrosine having an acid reaction to Congo red test paper with a small amount of an inorganic acid-binding agent, whereby a product neutral to Congo red test paper is obtained.

2. The process which comprises treating an aqueous suspension of spirit nigrosine having an acid reaction to Congo red test paper with a small quantity of alkali.

3. The process which comprises treating an aqueous suspension of spirit nigrosine having an acid reaction to Congo red test paper with alkali in an amount adapted to render the suspension faintly alkaline in reaction.

4. The process which comprises treating an aqueous suspension of spirit nigrosine having an acid reaction to Congo red test paper with a solution of alkali in an amount adapted to render the suspension faintly alkaline in reaction.

5. The process which comprises treating an aqueous suspension of spirit nigrosine having an acid reaction to Congo red test paper with a solution of caustic soda in an amount adapted to render the suspension faintly alkaline in reaction to brilliant yellow test paper.

6. In the production of spirit soluble nigrosine by reacting a nitro-compound of the aromatic series with the hydrochloride of an arylamine, whereby a spirit soluble nigrosine having an acid reaction to Congo red test paper is produced, the improvement which comprises treating said spirit soluble nigrosine in aqueous suspension with an alkali in an amount sufficient to eliminate the acid reaction to Congo red test paper.

7. In the production of spirit soluble nigrosine by reacting a nitro-compound of the aromatic series with the hydrochloride of an arylamine in the presence of iron chloride, whereby a spirit soluble nigrosine having an acid reaction to Congo red test paper is produced, the improvement which comprises treating said spirit soluble nigrosine in aqueous suspension with a small quantity of alkali, whereby the acid reaction to Congo red test paper is eliminated.

8. The process which comprises reacting a nitrocompound of the aromatic series with the hydrochloride of an arylamine for the production of spirit nigrosine, drowning the spirit nigrosine in water, washing out excess hydrochloric acid, and treating a suspension of the spirit nigrosine with a small quantity of alkali sufficient to show a faint alkaline reaction to brilliant yellow test paper.

9. The process which comprises treating spirit soluble nigrosine having an acid reaction to Congo red test paper with a small amount of an inorganic acid-binding agent selected from the group consisting of, caustic soda, lime, potash, soda ash and ammonia, in an aqueous medium, whereby a product neutral to Congo red test paper is obtained.

10. The process which comprises treating spirit soluble nigrosine having an acid reaction to Congo red test paper with an alkali in an amount substantially just sufficient to give a resulting product neutral to Congo red test paper.

11. A spirit soluble nigrosine obtainable by the interaction of a nitrocompound of the aromatic series with the hydrochloride of an arylamine and which, when dry and ground, forms a reddish-black powder readily soluble in alcohol, insoluble in water, and which in aqueous suspension is neutral to Congo red test paper.

12. A spirit soluble nigrosine obtainable by the interaction of a nitro benzene with aniline hydrochloride and which is readily soluble in alcohol, insoluble in water, and when dry and ground appears as a reddish-black powder which forms a suspension in water that is neutral to Congo red test paper.

SPENCER C. KIMMEL.